US006853651B1

United States Patent
Coan et al.

(10) Patent No.: US 6,853,651 B1
(45) Date of Patent: Feb. 8, 2005

(54) SYSTEM AND METHOD FOR OUTBOX-CAPABLE WIRELESS TRANSMISSION

(75) Inventors: William Patrick Coan, Monroe, WA (US); Michael Luna, Brentwood, CA (US)

(73) Assignee: Cingular Wireless II, Inc., Redmond, WA (US)

( * ) Notice: Subject to any disclaimer, the term of this patent is extended or adjusted under 35 U.S.C. 154(b) by 0 days.

(21) Appl. No.: 09/335,127

(22) Filed: Jun. 17, 1999

(51) Int. Cl.[7] .................................................. H04J 3/12
(52) U.S. Cl. ...................... 370/524; 370/326; 370/437; 370/468
(58) Field of Search ................................ 370/524, 468, 370/321, 337, 347, 442, 314, 322, 323, 326, 329, 341, 431, 437, 438; 455/70, 450, 511, 522, 422.1, 71

(56) References Cited

U.S. PATENT DOCUMENTS

| | | |
|---|---|---|
| RE34,976 E | 6/1995 | Helferich et al. |
| 5,442,390 A | 8/1995 | Hooper et al. |
| 5,485,611 A | 1/1996 | Astle |
| 5,497,373 A | 3/1996 | Hulen et al. |
| 5,541,978 A * | 7/1996 | Brunner et al. ............. 455/423 |
| 5,598,417 A | 1/1997 | Crisler et al. |
| 5,606,548 A * | 2/1997 | Vayrynen et al. ........... 370/252 |
| 5,615,213 A * | 3/1997 | Griefer ....................... 370/412 |
| 5,649,105 A | 7/1997 | Aldred et al. |
| 5,652,789 A | 7/1997 | Miner et al. |
| 5,666,651 A | 9/1997 | Wang |
| 5,680,551 A | 10/1997 | Martino, II |
| 5,710,798 A | 1/1998 | Campana, Jr. |
| 5,726,984 A | 3/1998 | Kubler et al. |
| 5,737,691 A | 4/1998 | Wang et al. |
| 5,751,702 A | 5/1998 | Evans et al. |
| 5,757,801 A | 5/1998 | Arimilli |
| 5,764,736 A | 6/1998 | Shachar et al. |
| 5,778,024 A | 7/1998 | McDonough |
| 5,778,187 A | 7/1998 | Monteiro et al. |
| 5,781,227 A | 7/1998 | Goode et al. |
| 5,787,254 A | 7/1998 | Maddalozzo, Jr. et al. |
| 5,797,089 A | 8/1998 | Nguyen |
| 5,799,165 A | 8/1998 | Favor et al. |
| 5,809,415 A | 9/1998 | Rossmann |
| 5,812,534 A | 9/1998 | Davis et al. |
| 5,818,829 A | 10/1998 | Raith et al. |
| 5,819,172 A | 10/1998 | Campana, Jr. et al. |
| 5,822,603 A | 10/1998 | Hanson et al. |
| 5,937,040 A * | 8/1999 | Wrede et al. ............. 379/93.23 |
| 5,970,057 A * | 10/1999 | Raith et al. .................. 370/324 |
| 6,064,889 A * | 5/2000 | Fehnel ........................ 455/511 |
| 6,097,961 A * | 8/2000 | Alanara et al. ............. 455/450 |
| 6,148,208 A * | 11/2000 | Love .......................... 370/332 |
| 6,212,386 B1 * | 4/2001 | Briere et al. ................ 455/447 |
| 6,222,837 B1 * | 4/2001 | Ahuja et al. ................ 370/352 |
| 6,434,367 B1 * | 8/2002 | Kumar et al. ................ 455/70 |

* cited by examiner

*Primary Examiner*—Nick Corsaro
*Assistant Examiner*—John J. Lee
(74) *Attorney, Agent, or Firm*—Kenyon & Kenyon

(57) ABSTRACT

A method and apparatus for wireless communication for non-latency-dependent data comprises receiving data to be transmitted over a digital control channel. If the data is appropriate for transmission over the digital control channel, then the data is so transmitted if the network conditions are favorable for such a transmission. If network conditions are not favorable for transmission over the digital control channel, then the data is queued for future transmission.

20 Claims, 3 Drawing Sheets

SYSTEM AND METHOD FOR OUTBOX-CAPABLE WIRELESS TRANSMISSION

FIELD OF THE INVENTION

The present invention relates to wireless communication. In particular, the present invention relates to systems and methods for providing interaction by non-latency-dependent and carrier-controlled applications.

BACKGROUND

Mobile systems exist that allow for both voice communication (e.g., a mobile telephone) and general data transfer (e.g., mobile Internet Protocol). In addition, cellular radio communications systems provide paging/access, or control, channels for carrying call-setup messages between base stations and mobile stations. These functions can be combined in a single device, but must be functionally separated to take maximal advantage of all functions. This is because TDMA cellular traffic operates in a buffer and burst, or discontinuous-transmission, mode. That is, each mobile station transmits and receives only during its assigned time slots. At full rate, for example, a mobile station might transmit during slot 1, receive during it) slot 2, idle during slot 3, transmit during slot 4, receive during slot 5, and idle during slot 6, and then repeat the cycle during succeeding TDMA frames. Thus, while a mobile system is carrying voice data over a traffic channel, data can be sent in either direction.

One defining feature of all prior art systems is that the prior art systems contain, on the one hand, traffic channels to carry traffic data, and on the other hand, overhead channels dedicated to the functional aspects of a mobile-station to base-station interaction. For example, hand shaking occurs over these overhead channels. Because of bandwidth and other functional constraints, no traffic data is saved over the overhead channels, also known as digital control channels (DCCH). For example, general browsing is conducted over a wireless Internet protocol (IP) session, at which time the device essentially is dedicated to data service.

Much of the traffic data carried by the mobile system is very short-burst data such as e-mail. Because this data can be transmitted in a relatively short burst, however, the time typically taken by the mobile system to set up a communication channel to transmit the burst is greater than the duration of the burst. This inefficiency, based on the short duration of the burst, is rampant among these types of systems. It is possible to use the DCCH for this sort of short-burst data, but in the IS-136 TDMA environment, the use of an IS-136 digital control channel (DCCH) for interactive data services presents several problems. First, the latency of the channel is unacceptable for general network-browsing functionality, and second, the use of the DCCH for this purpose could impact the quality of the voice service provided by the network. Thus, any use of the DCCH must be limited to use by short-burst data that can tolerate a high-latency connection.

Thus, it is desirable to queue application-service requests in the background of general wireless use, over the DCCH, without the invocation of a full wireless IP session that would allow the operation of functions without forcing the user into the browser mode of the device.

SUMMARY OF THE INVENTION

To alleviate the problems inherent in the prior art, systems and methods are introduced to provide wireless communication to a network.

In one embodiment of the present invention, non-latency dependent data is received for transmission to a base station. If the data is not appropriate for transmission over a digital control channel, the data is transmitted over a traffic channel. If the data is appropriate for transmission over the digital control channel, it is determined whether network conditions are favorable for transmission over the digital control channel. If network conditions are favorable for transmission over the digital control channel, the data is transmitted by the digital control channel to the base station. If network conditions are not favorable for transmission over the digital control channel, the data is queued for future transmission. The network is then monitored and the data is sent when it is determined that network conditions are favorable for transmission over the digital control channel.

DETAILED DESCRIPTION

The present invention relates to wireless communication for non-latency-dependent data that is transmitted over a digital control channel, thereby providing near-seamless operation between idle, voice and interactive modes.

Figure 1:
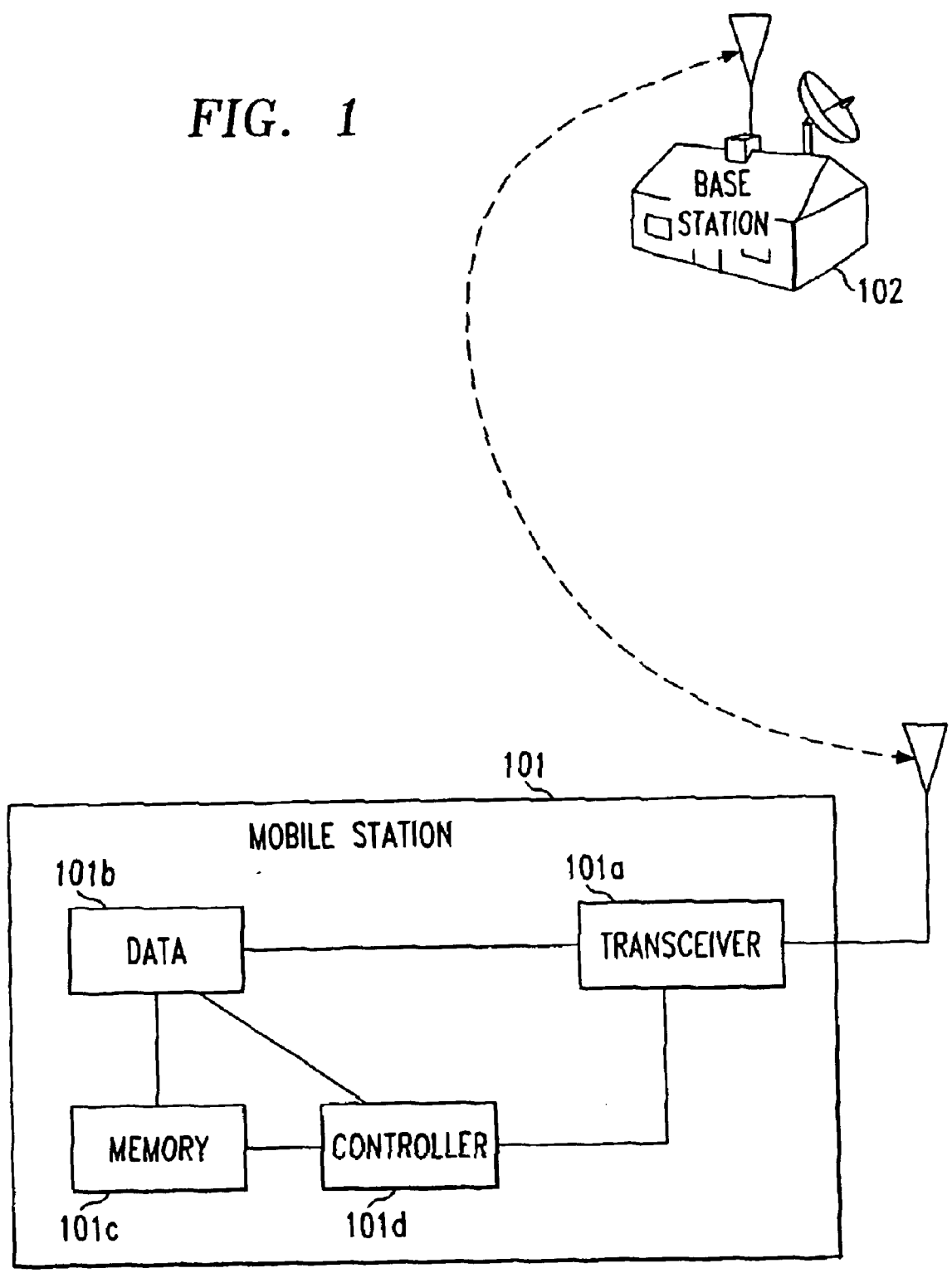
FIG. 1 is a system overview of an embodiment of the present invention, featuring a mobile station and a base station.

FIG. 1 is an overview of an embodiment of the present invention featuring mobile station 101 and base station 102. Mobile station 101 in this embodiment contains transceiver 101a, data preprocessor 101b, memory 101c, and controller 101d. Transceiver 101a receives data from base station 102 and transmits data to base station 102. Data preprocessor 101b preprocesses the data for transmission. Memory 101c can store data and application instructions. Controller 101d can control the functions of mobile station 101, and process the instructions stored in memory 101c. The processing can include manipulating, transmitting, and displaying data stored in memory 101c.

In particular, memory 101c can store instructions adapted to be executed by controller 101d to determine whether data is appropriate for transmission over a digital control channel, determine whether network conditions are favorable for transmission over a digital control channel, and instruct transceiver 101a to transmit data either over a traffic channel or a digital control channel. If network conditions are not favorable for transmission, the data to be transmitted can be buffered in memory 101c in a queue waiting for future transmission.

A user can interact with the data stored in memory 101c via a graphical user interface (GUI). This GUI can be used to alert the user that mobile station 101 has received data, or is ready to transmit data. Additionally, this GUI can display the user's prioritization and timing information with regard to the data. Operations on the data, such as reading the data, deleting the data, etc., can be performed by operating on the contents of the GUI. All incoming and outgoing information can be posted and displayed in the GUI, and can be accessible from any operating mode of the mobile station. In other words, the user can have access to the data from either operating mode (voice or data).

In one embodiment of the present invention, base station 102 is capable of determining whether the data received from mobile station 101 via the digital control channel is application information rather than control information. In another embodiment of the present invention, base station 102 can be connected to a gateway (not shown) that is capable of determining whether application data is appropriate for transmission to mobile station 101 via a digital control channel.

Figure 2:
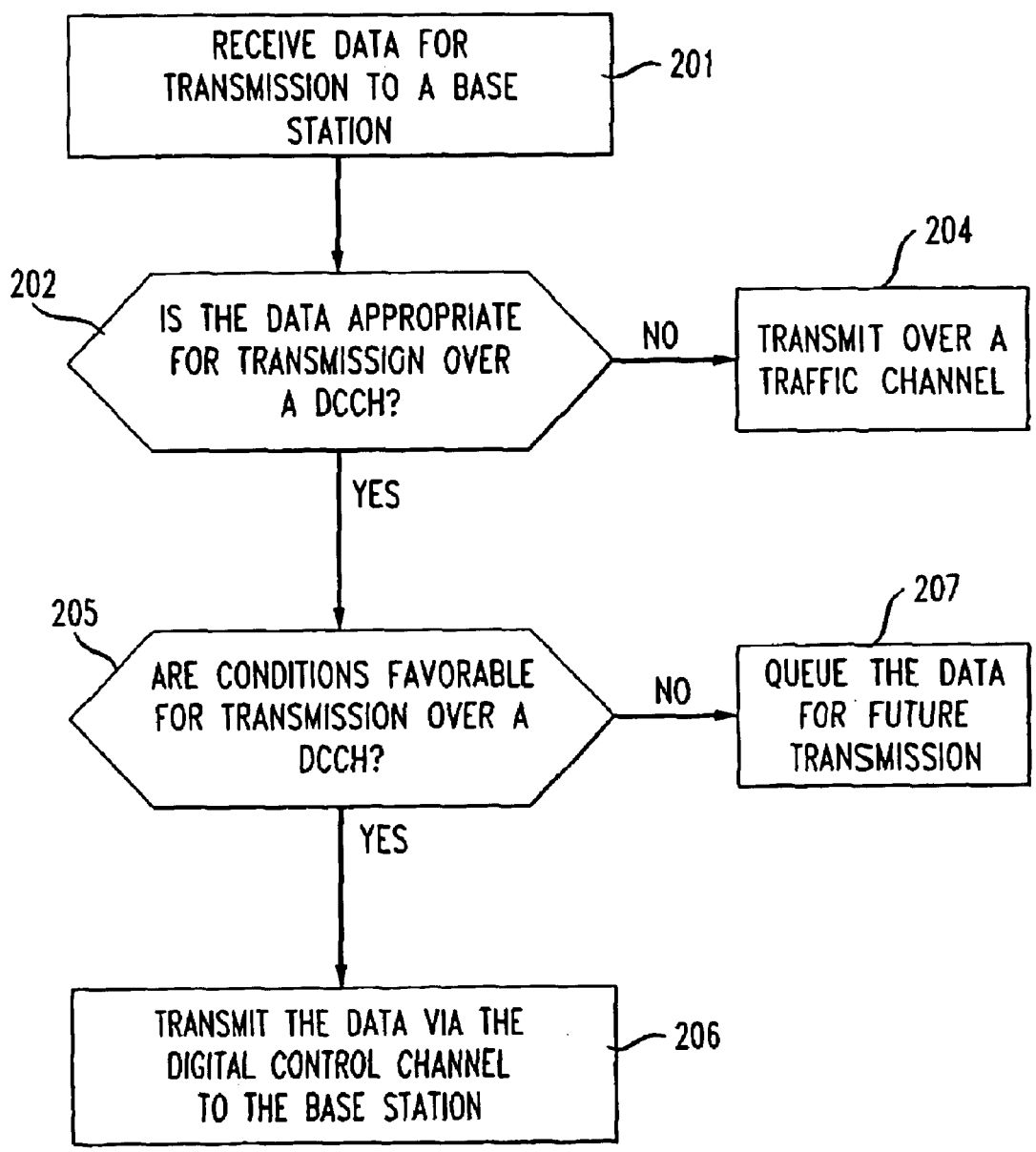
FIG. 2 is a flow chart of an embodiment of the present invention.

FIG. 2 is a flow chart of an embodiment of the present invention. At step 201, data is received for transmission to a base station. At step 202, it is determined whether the data is appropriate for transmission over a digital control channel. This determination is based on the size of the data to be transmitted, and how much the data depends on the connection's latency. In one embodiment of the present invention, this determination is based on at least an upper limit on the size of the data to be sent. This determination can be performed by an application stored in memory 101c. For example, an application stored in memory 101c can store instructions that place an upper limit on the size of data that it will send via the digital control channel. If the amount of data is less than that upper limit, controller 101d will accept the data for transmission via the digital control channel.

As another example, an application stored in memory 101c can determine whether the data to be sent is non-latency-dependent data such as e-mail. If the data is non-latency-dependent, the data can be tagged as such so that it can be transmitted via the digital control channel. Examples of data appropriate for sending over the digital control channel include, but are not limited to, e-mail messages, pages, personal-organizer updates, stock quotes, e-commerce, sports scores, news headlines, or any Internet content.

If the data is too large to be transmitted over the digital control channel, then at step 204 the data is transmitted over a traffic channel. If the data is appropriate for transmission over a digital control channel, then at step 205 it is determined whether network conditions are favorable for transmission over the digital control channel.

In one embodiment of the present invention, mobile station 101 can monitor the network to determine whether there is sufficient bandwidth or there are slots available within the digital control channel for transmission. In another embodiment of the present invention, the mobile station can check to see if there is a channel available for transmitting a message prior to submitting the message for transmission. This can be performed by lower-layer (e.g., device layer) functions that monitor for channel availability. This lower-layer function can be, for example, but not the only example, the same voice-specific function used by a mobile terminal to acknowledge telephone pages. Thus, the data is transmitted from or delivered to mobile station 101 when the data-delivery system has locked on to the DCCH, and a free time slot is found into which the data can be inserted.

In one embodiment of the present invention, the mobile station can make a delivery request to a data-delivery subsystem. The subsystem can either respond by positively acknowledging the request indicating that the mobile terminal is on and a channel is found, or by a negative acknowledgment indicating that the mobile terminal is off, out of radio coverage, out in of DCCH coverage, or that no channel is available.

If network conditions are favorable for transmission over a digital control channel, then at step 206 the data is transmitted via the digital control channel to the base station. If network conditions are not favorable for transmission over the digital control channel, then at step 207 the data is queued for future transmission.

In one embodiment the present invention, the data is prioritized before it is placed in the queue for transmission. In another embodiment of the present invention, the data is queued for future transmission at some predetermined time.

In general, all applications that have the ability to take advantage of this invention can use pre-fetch techniques to store the appropriate information required to manage the desired functionality and can use the DCCH to fetch information that is not contained within the mobile station's memory.

Because the memory storing the data for transmission exists independent of connection to any data-transmission channel, requests to the Outbox can be posted at any time, regardless of the cellular status (e.g., when the phone is an area with no service coverage).

Figure 3:
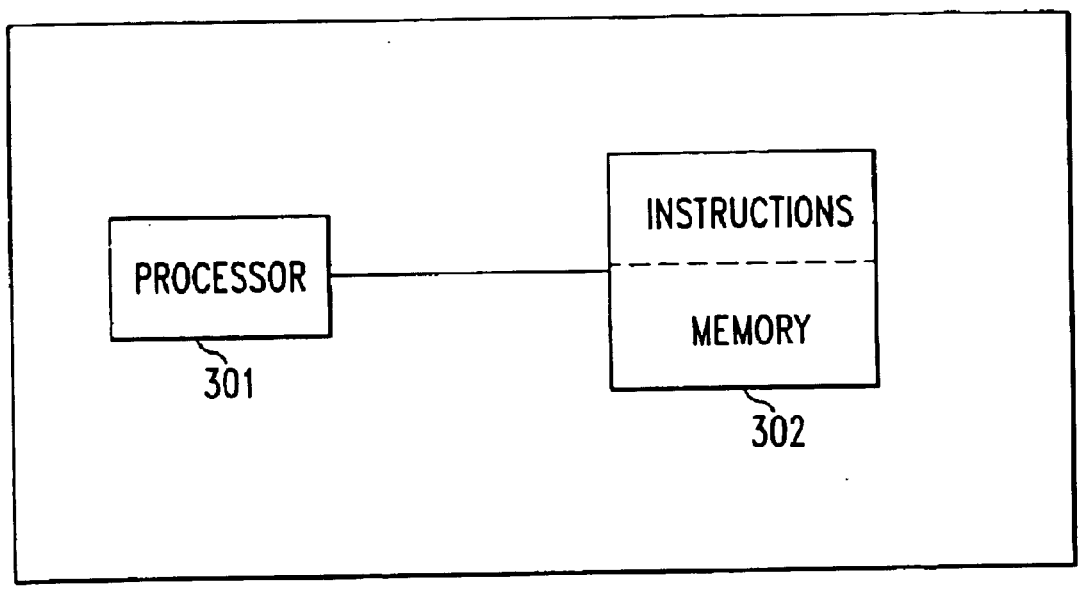
FIG. 3 is a block diagram of an embodiment of the present invention featuring a processor and a memory.

FIG. 3 is a block diagram of an apparatus according to an embodiment of the present invention. The apparatus contains processor 301 and memory 302. Memory 302 stores instructions adapted to be executed by processor 301 to perform any method embodiment of the present invention. For example, memory 302 stores instructions adapted to be executed by processor 301 to receive data for transmission to a base station; to determine whether the data is appropriate for transmission over a digital control channel; if the data is appropriate for transmission over a digital control channel, to determine whether network conditions are favorable for transmission over a digital control channel; and if network conditions are favorable, to transmit the data over a digital control channel to the base station.

For the purposes of this application, memory includes any medium capable of storing instructions adapted to be executed by a processor. Some examples of such media include, but are not limited to, RAM, ROM, floppy disks, CDROM, magnetic tape, hard drives, optical storage units, and any other device that can store digital information. In one embodiment, the instructions are stored on the medium in a compressed and/or encrypted format. As used herein, the phrase "adapted to be executed by a processor" is meant to encompass instructions stored in a compressed and/or encrypted format, as well as instructions that have to be compiled or installed by an installer before being executed by the processor.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A method for wireless communication for non-latency-dependent data, the method comprising:
    (a) receiving data for transmission to a base station;
    (b) determining, based on an absence of a latency dependency of the data due to a content of the data, wherein the content includes at least one of private, public or business information, whether the data is appropriate for transmission over a digital control channel; and
    (c) if the data is not appropriate for transmission over a digital control channel, transmitting the data over a traffic channel.

2. The method of claim 1, wherein said determining includes determining whether the data is less than a predetermined size.

3. A method for wireless communication for non-latency-dependent data, the method comprising:

(a) receiving data for transmission to a base station;

(b) determining, based on an absence of a latency dependency of the data due to a content of the data, wherein the content includes at least one of private, public or business information, whether the data is appropriate for transmission over a digital control channel;

(c) if the data is appropriate for transmission over a digital control channel, determining whether network conditions are favorable for transmission over a digital control channel; and (d) if network conditions are favorable, transmitting the data over a digital control channel to the base station.

4. The method of claim 3, further comprising the steps of:

(e) queuing the data for future transmission if network conditions are not favorable for transmitting the data; and (f) repeating step (c) until network conditions are favorable for transmitting data.

5. The method of claim 4, wherein said determining whether the data is appropriate for transmission over a digital control channel includes determining whether the data is less than a predetermined size.

6. The method of claim 5, wherein conditions favorable for transmission include the existence of a slot in the digital control channel into which the data can be placed for transmission.

7. A method for wireless communication for non-latency-dependent data, the method comprising:

(a) receiving data for transmission to a base station;

(b) determining, based on an absence of a latency dependency of the data due to a content of the data, wherein the content includes at least one of private, public or business information, whether the data is appropriate for transmission over a digital control channel;

(c) if the data is appropriate for transmission over a digital control channel, queuing the received data for transmission;

(c) monitoring network conditions for conditions favorable for transmission; and (d) transmitting the data over a digital control channel when network conditions are favorable for transmission.

8. The method of claim 7, wherein the conditions favorable for transmission include the existence of a slot in the digital control channel into which the data can be placed for transmission.

9. An apparatus for transmitting non-latency-dependent data over a wireless system, the apparatus comprising:

(a) a processor, and (b) a memory coupled to said processor, said memory storing instructions adapted to be executed on said processor, the instructions including:

(i) receiving data for transmission to a base station;

(ii) determining, based on an absence of a latency dependency of the data due to a content of the data, wherein the content includes at least one of private, public or business information, whether the data is appropriate for transmission over a digital control channel;

(iii) if the data is appropriate for transmission over a digital control channel, determining whether network conditions are favorable for transmission over a digital control channel; and (iv) if network conditions are favorable, transmitting the data over a digital control channel to the base station.

10. The apparatus of claim 9, said memory storing further instructions adapted to be executed on said processor, said further instructions including:

(v) queuing the data for future transmission if network conditions are not favorable for transmitting the data; and (vi) repeating step (iii) until network conditions are favorable for transmitting data.

11. The apparatus of claim 10, wherein said determining whether the data is appropriate for transmission over a digital control channel includes determining whether the data is less than a predetermined size.

12. The apparatus of claim 11, wherein conditions favorable for transmission include the existence of a slot in the digital control channel into which the data can be placed for transmission.

13. An apparatus for wireless communication for non-latency-dependent data, the apparatus comprising:

(a) a processor; and (b) a memory coupled to said processor, said memory storing instructions adapted to be executed on said processor, said instructions including:

(i) receiving data for transmission to a base station;

(ii) determining, based on an absence of a latency dependency of the data due to a content of the data, wherein the content includes at least one of private, public or business information, whether the data is appropriate for transmission over a digital control channel;

(iii) if the data is appropriate for transmission over a digital control channel, queuing the received data for transmission;

(iv) monitoring network conditions for conditions favorable for transmission; and (v) transmitting the data over a digital control channel when network conditions are favorable for transmission.

14. The apparatus of claim 13, wherein the conditions favorable for transmission include the existence of a slot in the digital control channel into which the data can be placed for transmission.

15. A medium for wireless communication of non-latency-dependent data, the medium storing instructions adapted to be executed on a processor, the instructions comprising:

(a) receiving data for transmission to a base station;

(b) determining, based on an absence of a latency dependency of the data due to a content of the data, wherein the content includes at least one of private, public or business information, whether the data is appropriate for transmission over a digital control channel;

(c) if the data is appropriate for transmission over a digital control channel, determining whether network conditions are favorable for transmission over a digital control channel; and (d) if network conditions are favorable, transmitting the data over a digital control channel to the base station.

16. The medium of claim 15, said medium storing further instructions adapted to be executed on a processor, the further instructions comprising:

(e) queuing the data for future transmission if network conditions are not favorable for transmitting the data; and (f) repeating step (c) until network conditions are favorable for transmitting data.

17. The medium of claim 16, wherein said determining whether the data is appropriate for transmission over a digital control channel includes determining whether the data is less than a predetermined size.

18. The medium of claim 17, wherein medium conditions favorable for transmission include the existence of a slot in the digital control channel into which the data can be placed for transmission.

19. A medium for wireless communication for non-latency-dependent data, the medium storing instructions adapted to be executed a processor, the instructions comprising:

(a) receiving data for transmission to a base station;

(b) determining, based on an absence of a latency dependency of the data due to a content of the data, wherein the content includes at least one of private, public or business information, whether the data is appropriate for transmission over a digital control channel;

(c) if the data is appropriate for transmission over a digital control channel, queuing the received data for transmission;

(c) monitoring network conditions for conditions favorable for transmission; and (d) transmitting the data over a digital control channel when network conditions are favorable for transmission.

20. The medium of claim 19, wherein the conditions favorable for transmission include the existence of a slot in the digital control channel into which the data can be placed for transmission.

* * * * *